(12) United States Patent
Tucker

(10) Patent No.: US 10,041,781 B1
(45) Date of Patent: Aug. 7, 2018

(54) MULTI-PASS OPTICAL SYSTEM TO IMPROVE RESOLUTION OF INTERFEROMETERS

(71) Applicant: Southern Research Institute, Birmingham, AL (US)

(72) Inventor: James Richard Tucker, Hoover, AL (US)

(73) Assignee: Southern Research Institute, Birmingham, AL (US)

( * ) Notice: Subject to any disclaimer, the term of this patent is extended or adjusted under 35 U.S.C. 154(b) by 0 days.

(21) Appl. No.: 15/622,862

(22) Filed: Jun. 14, 2017

(51) Int. Cl.
*G01B 9/02* (2006.01)

(52) U.S. Cl.
CPC ..... *G01B 9/02019* (2013.01); *G01B 9/02016* (2013.01)

(58) Field of Classification Search
CPC ............ G01B 9/02015; G01B 9/02018; G01B 9/02019; G01B 2290/15
See application file for complete search history.

(56) References Cited

U.S. PATENT DOCUMENTS

| | | | | |
|---|---|---|---|---|
| 6,208,424 B1 * | 3/2001 | de Groot | ............ | G01B 9/02007 356/486 |
| 2003/0197869 A1 * | 10/2003 | Johnstone | .......... | G01B 9/02007 356/493 |
| 2005/0264823 A1 * | 12/2005 | Zhu | .................... | G01B 9/02019 356/493 |

OTHER PUBLICATIONS

Ahn, J., et al., "High Resolution Interferometer with Multiple-pass Optical Configuration," Optics Express, vol. 17, No. 23 (Nov. 9, 2009).
Vitushkin, A.L., and L.F. Vitushkin, "Design of a Multipass Optical Cell Based on the Use of Shifted Corner Cubes and Right-angle Prisms," Applied Optics, vol. 37, No. 1, p. 162-165 (Jan. 1, 1998).
Wei, R., et al., "Designs of Multipass Configurations Based on the Use of a Cube Corner Retroreflector in the Interferometer," Applied Optics, vol. 50, No. 12, p. 1673-1681 (Apr. 20, 2011).

* cited by examiner

*Primary Examiner* — Jonathan Hansen
(74) *Attorney, Agent, or Firm* — Edell, Shapiro & Finnan, LLC

(57) ABSTRACT

An interferometer is provided that includes a single retroreflector arranged at a target plane and a plurality of retroreflectors arranged at a reference plane of the interferometer. The single retroreflector and the plurality of retroreflectors are positioned such that a measurement beam provided to the interferometer makes a plurality of passes between the single retroreflector and the plurality of retroreflectors. One of the plurality of retroreflectors is positioned as a terminal retroreflector that reflects the measurement beam back on itself such that an output of the interferometer is coaxial with an input to the interferometer.

20 Claims, 8 Drawing Sheets

MULTI-PASS OPTICAL SYSTEM TO IMPROVE RESOLUTION OF INTERFEROMETERS

TECHNICAL FIELD

The present disclosure relates to interferometry and interferometers.

BACKGROUND

Interferometry is a family of techniques in which waves, usually electromagnetic, are superimposed in order to extract information. Interferometry may be used in the fields of astronomy, fiber optics, engineering metrology, optical metrology, oceanography, seismology, spectroscopy (and its applications to chemistry), quantum mechanics, nuclear and particle physics, plasma physics, biomolecular interactions, surface profiling, microfluidics, mechanical stress/strain measurement, velocimetry, and optometry.

Interferometers are widely used in science and industry for the measurement of small displacements, refractive index changes and surface irregularities. In certain fields, measurement of displacements and/or surface irregularities at the picometer scale is desirable. Accordingly, interferometers with picometer level sensitivity may be beneficial. One manner of improving interferometer sensitivity is to provide an interferometer in which multiple measuring passes are made between the reference plane and target plane of the interferometer.

DESCRIPTION OF EXAMPLE EMBODIMENTS

Overview

Provided for herein are apparatuses comprising interferometers and methods of constructing interferometers. According to example embodiments, an interferometer is provided that includes a single retroreflector arranged at a target plane of the interferometer and a plurality of retroreflectors arranged at a reference plane of the interferometer. The single retroreflector and the plurality of retroreflectors are positioned such that a measurement beam provided to the interferometer makes a plurality of passes between the single retroreflector and the plurality of retroreflectors. One of the plurality of retroreflectors is positioned as a terminal retroreflector that reflects the measurement beam back on itself such that an output of the interferometer is coaxial to an input of the interferometer.

Example Embodiments

Figure 1:
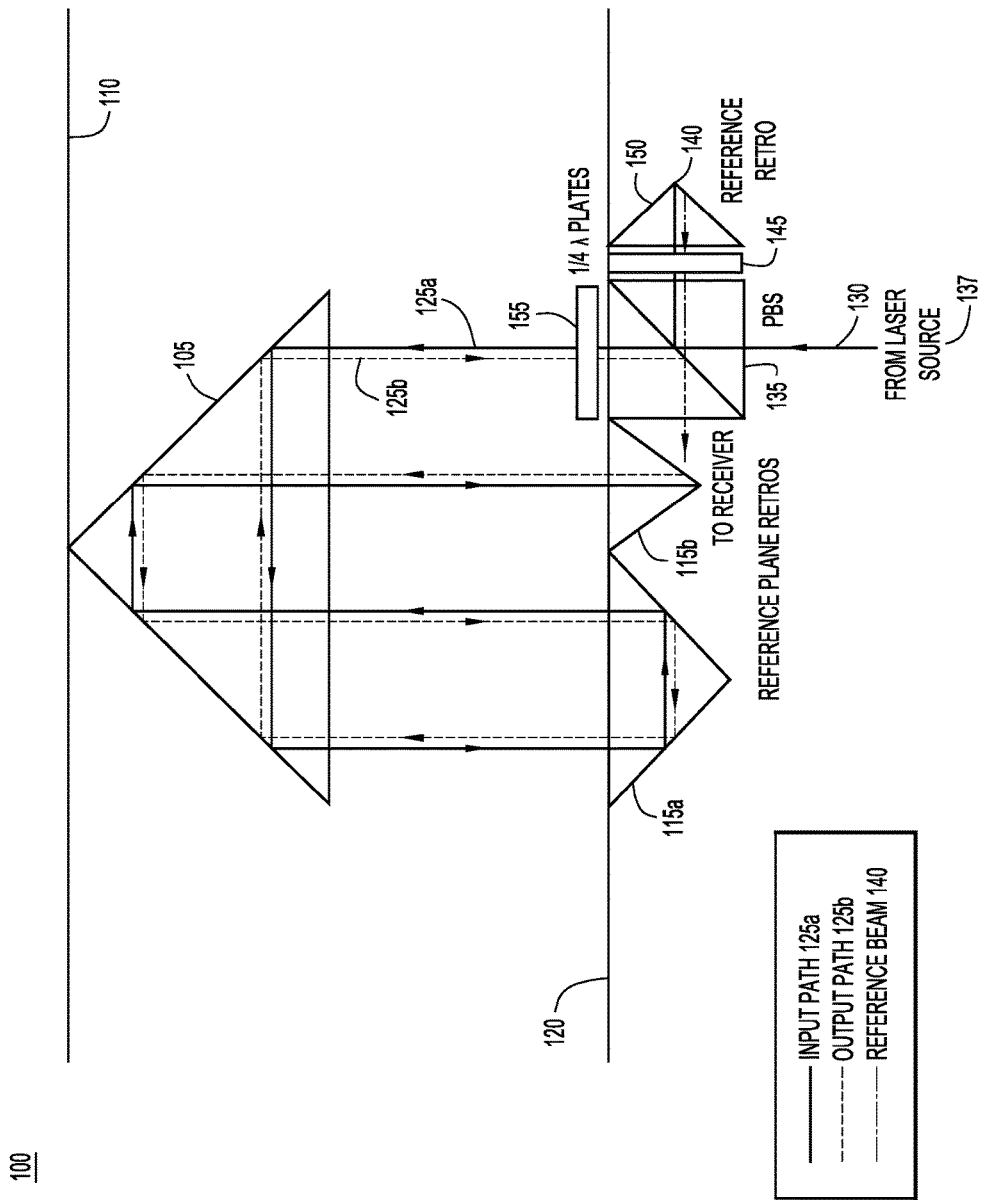
FIG. 1 is an elevation view of a first interferometer utilizing a multi-pass optical system, according to an example embodiment.

With reference to FIG. 1, depicted therein is an elevation view of an interferometer 100 configured to provide multiple passes between a reference plane 120 and target plane 110. Included in target plane 110 is a target retroreflector 105. A plurality of retroreflectors 115a and 115b are arranged within a reference plane 120. According to the present example, target retroreflector 105 has a radius of R, reference plane retroreflector 115a has a radius of ½R, and reference plane retroreflector 115b has a radius of ¼R. In real world examples, the value of R may be any size but an R of one inch would result in commercially available retroreflectors of two, one, and half-inch diameter retroreflectors. Likewise, an R of one-half an inch would result in commercially available retroreflectors of one, half, and quarter-inch diameter retroreflectors. Because of this size differential, multiple passes between target retroreflector 105 and the plurality of retroreflectors arranged in the reference plane (i.e., retroreflectors 115a and 115b) may be effectuated. Furthermore, the spacing between the plurality of retroreflectors arranged in the reference plane (i.e., retroreflectors 115a and 115b) and beam splitter 135 also effectuates the multiple passes, which are described in greater detail below.

Also illustrated in FIG. 1 is a beam path of a measurement beam 125a and 125b. The measurement beam is referenced by the two numbers to indicate the beam travelling in an input direction 125a, and in an output direction 125b. While the beam in the input direction 125a and beam in the output direction 125b are illustrated as being slightly offset, this is done for ease of view in the present disclosure. In example embodiments the beam in the input direction 125a and the beam in the output direction 125b may overlap substantially so as to be considered coaxial and/or coincident on target retroreflector 105 and reference plane retroreflectors 115a and 115b.

As shown in FIG. 1, a source beam 130 is provided to beam splitter 135 from a light source 137, such as a laser light source. Example laser light sources may include linear, orthogonally polarized lasers of nominal wavelength 633 nm. Beam splitter 135 splits the source beam 130 into the measurement beam in the input direction 125a and a reference beam 140. The beam splitter 135 may be embodied as a polarizing beam splitter. Reference beam 140 passes through quarter wave plate 145 and enters reference retroreflector 150, by which reference beam 140 is reflected back towards beam splitter 135.

The measurement beam in the input direction 125a proceeds through quarter wave plate 155 and is incident on target retroreflector 105, performing a first pass through target retroreflector 105. This first pass through target retroreflector 105 serves as the first measurement pass of target plane 110. The measurement beam in the input direction 125a is then reflected from target retroreflector 105 onto reference plane retroreflector 115a. The measurement beam in the input direction 125a passes reference plane retroreflector 115a and is reflected back onto target retroreflector 105. The measurement beam in the input direction 125a passes target retroreflector 105 for a second time, making a second measurement pass of target plane 110. The measurement beam in the input direction 125a is then reflected from target retroreflector 105 so that it is incident on reference plane retroreflector 115b. Reference plane retroreflector 115b is arranged within the optical path of the measurement beam such that the measurement beam is redirected back towards the beam splitter in an output path 125b. According the example of FIG. 1, the output path 125b is coaxial with the input path 125a, but in the opposite direction. Accordingly, the measurement beam in the output direction 125b makes two more measurement passes of the target plane 110, once after being reflected by reference plane retroreflector 115b onto target retroreflector 105, and once after reflection from reference plane retroreflector 115a onto target reference plane retroreflector 105.

As used herein, reference plane retroreflector 115b may be considered a "terminal retroreflector" as it is the reference plane retroreflector at which the reference beam turns back on itself, going from travelling along input path 125a to output path 125b. Furthermore, as illustrated in FIG. 1, reference plane retroreflector 115b is more specifically arranged such that the output path 125b is coaxial with input path 125a (though the paths are illustrated as being slightly offset in FIG. 1 so that the paths are more easily distinguished for purposes of the present description). For example, retroreflector 115b may be arranged such that the measurement beam is incident on a vertex of retroreflector 115b. According to other example embodiments, the terminal reflector may be embodied as another type of a reflector, such as a planar mirror, that will reflect the measurement beam such that output path 125b is coaxial with input path 125a. Though, the use of a retroreflector as the terminal reflector may provide benefits, such as ease of alignment.

The measurement beam travels along the output path 125b, passes through quarter waveplate 155, is recombined with reference beam 140 in beam combiner 135, and is output to a sensor (not illustrated). The sensor may measure information regarding the target plane 110 based upon the superposition of the output measurement beam and the reference beam 140.

Because the measurement beam makes multiple passes of target retroreflector 105 (i.e., two passes along the input path 125a and two passes along the output path 125b), the interferometer 100 may be able to measure the position of target retroreflector 105 (and therefore the target plane 110) with increased sensitivity and/or resolution. For example, using an interferometer like that illustrated in FIG. 1, or as will be described in the further examples of FIGS. 2-7, measurements in the picometer stability regime may be acquired. Such high levels of precision may be used in the construction, calibration and operation of high powered laser devices, sophisticated electronics, and advanced optical devices, such as lithography and telescope devices.

As a further benefit, reference plane retroreflectors 115a and 115b are embodied as retroreflectors which are smaller than target retroreflector 105. Accordingly, as shown through FIG. 1, and as will also be shown in the further examples of FIGS. 2-7, interferometers with high resolution may be constructed from small form factors. Such small form factors allow the interferometer to be used in environments in which a small size is considered an important benefit. For example, in certain space applications, where size and weight requirements are stringent, the ability to provide very high resolution interferometric measurements in a device with a small form factor is extremely beneficial.

The techniques illustrated in FIG. 1 (as well as FIGS. 2-7) may be applied to example embodiments in which the target for measurement is homogenous or monolithic, such as a large mirror of a telescope. The reasoning behind this is that measurements made at different locations within the large target retroreflector will not show variations based upon changes in the target object and/or target plane. The techniques illustrated in FIG. 1 may also be applied to mediums being measured that are arranged along an axis passing through the vertex of the target retroreflector, as illustrated in FIG. 7 (described in more detail below).

Figure 2:
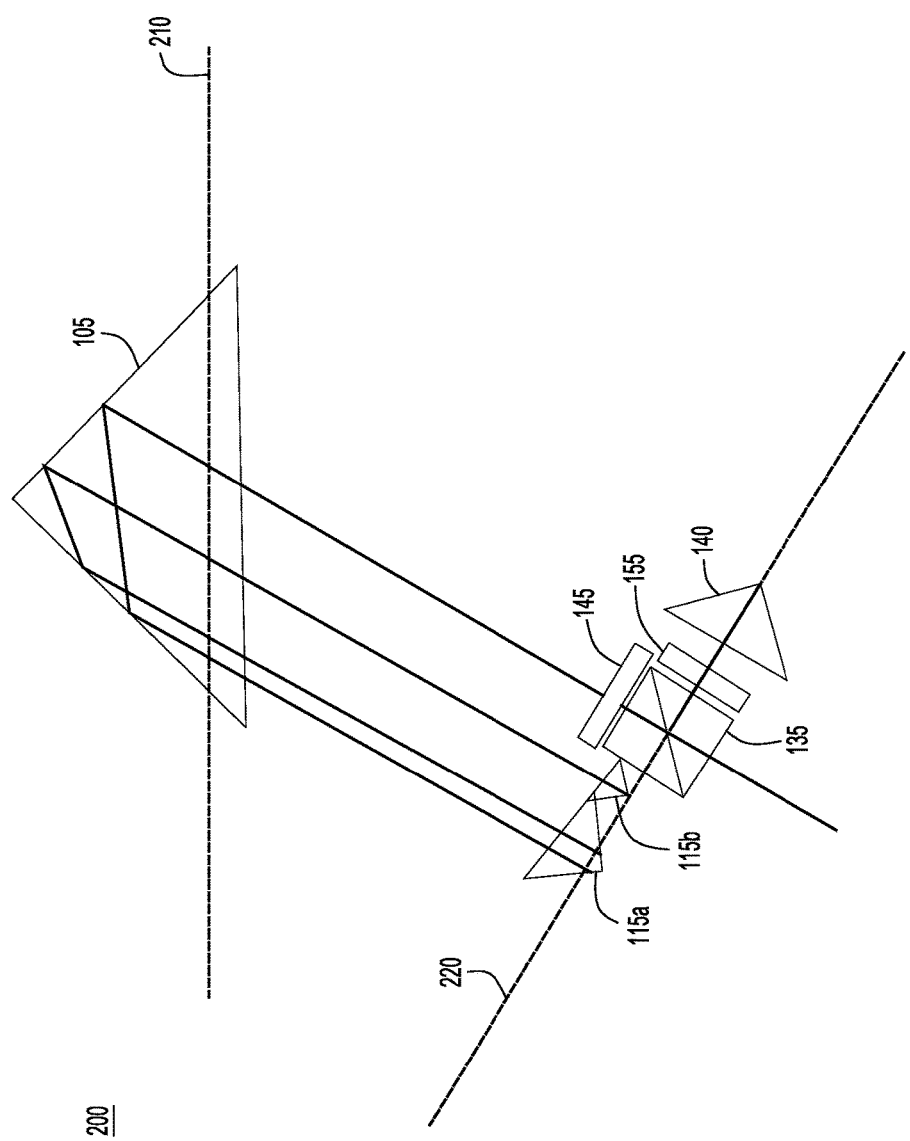
FIG. 2 is an elevation view of a second interferometer utilizing a multi-pass optical system, according to an example embodiment.
Figure 3:
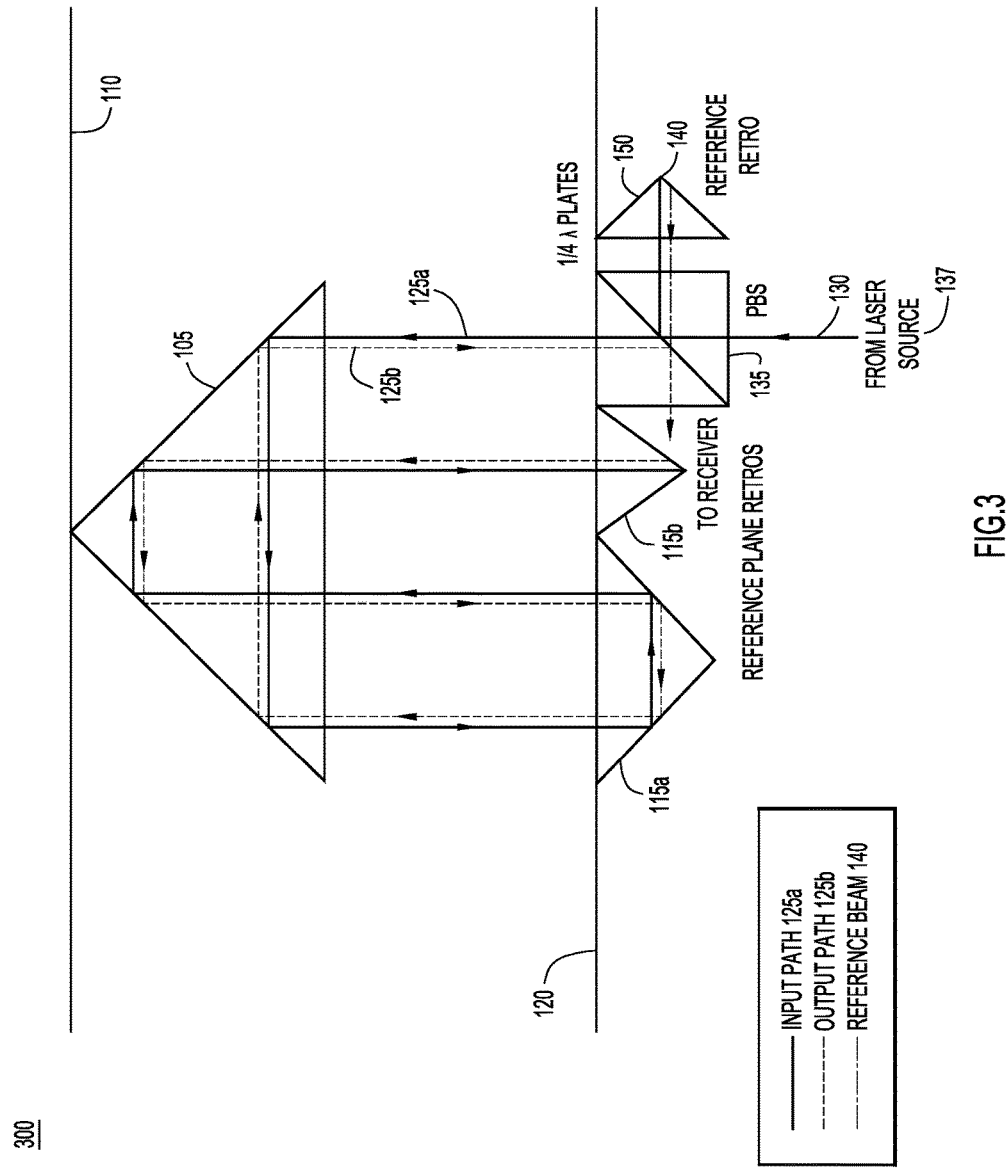
FIG. 3 is an elevation view of a third interferometer utilizing a multi-pass optical system, according to an example embodiment.

Finally, in the example of FIG. 1, the portions of input path 125a and output path 125b between target retroreflector 105 and reference plane retroreflectors 115a and 115b are perpendicular to target plane 110 and reference plane 120. As a result, the utilized portions of reference plane retroreflectors 115a and 115b are within a projection of target retroreflector 105 onto the reference plane 120. Specifically, the points of incidence of the measurement beam on the retroreflectors 115a and 115b are within the perpendicular projection of retroreflector 105 into the reference plane. Such arrangement is suitable for a compact interferometer. Though, other arrangements are possible. For example, illustrated in FIG. 2 is an elevation view of an interferometer 200 similar to that of FIG. 1, but differs in that reference plane 220 is not parallel to target plane 210. Also, other modifications to the apparatus of FIG. 1 may be made without deviating from the inventive concepts disclosed herein. For example, illustrated in FIG. 3 is an elevation view of an interferometer 300 similar to that of FIG. 1, but differs in that quarter wave plates 145 and 155 have been omitted from the interferometer.

Figure 4:
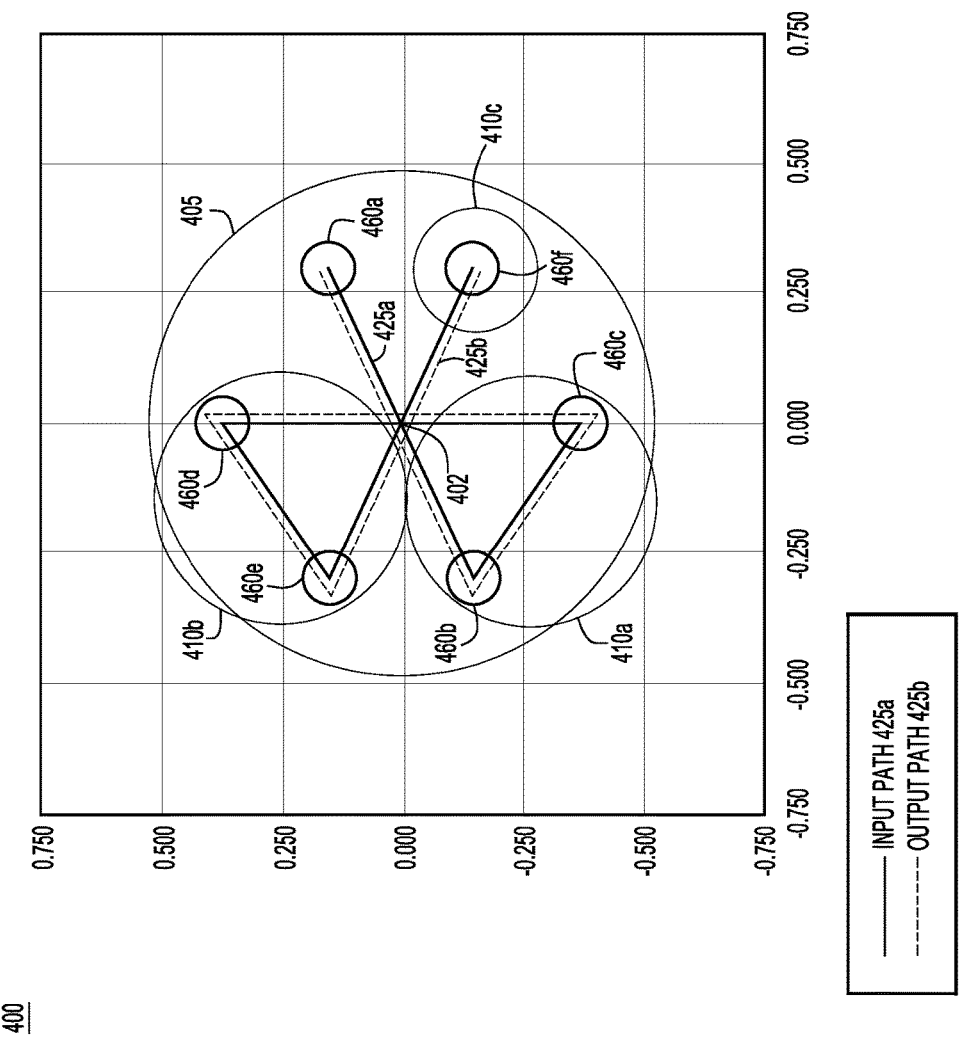
FIG. 4 is a plan view of a fourth interferometer utilizing a multi-pass optical system, according to an example embodiment.

With reference now made to FIG. 4, depicted therein is a plan view of another example interferometer 400 implementing the techniques described above with reference to FIG. 1, but instead provides six overall passes of target retroreflector 405. Specifically, FIG. 4 is illustrated as a projection of a footprint of reference plane retroreflectors 410a-c into the plane of the target retroreflector 405. Accordingly, the beam paths reflecting the measurement beam between target retroreflector 405 and reference plane retroreflectors 410a-c are in and out of the page. Points of incidence 460a-f illustrate where on either target retroreflector 405 or reference plane retroreflectors 410a-c the measurement beam in the input direction 425a and the measurement beam in the output direction 425b are incident on the retroreflectors. Interferometer 400 is configured such that the reference plane is parallel to the target plane (i.e., like the arrangement of FIG. 1), and the points of incidence on target retroreflector 405 overlap with the points of incidence on reference plane retroreflectors 410a-c. Target retroreflectors 410a-c are sized relative to target retroreflector 405 and positioned relative to each other such that there are multiple passes between the target plane and reference plane, and such that the passes in the input direction 425a and the output direction 425b step around a central axis 402 of the target retroreflector 405. Accordingly, interferometer 400 may be configured to measure the displacement of a medium arranged at the central axis 402. Furthermore, the points of incidence 460b-f of the measurement beam on the retroreflectors 410a-c are within the perpendicular projection of retroreflector 405 into the reference plane, even though portions of retroreflectors 410a and 410b are outside of the perpendicular projection of retroreflector 405 into the reference plane.

According to this example, target retroreflector 405 has a radius of R, reference retroreflectors 410a and 410b have a radius of ½R, and reference retroreflector 410c has a radius of ¼R. A representative value for R for such an arrangement would be one-half inch.

For ease of description, the measurement beam in the input direction 425a (represented by a solid line) and the measurement beam in the output direction 425b (represented by a dashed line) are illustrated as being slightly offset. In example embodiments, the measurement beam in the input direction 425a and the measurement beam in the output direction 425b may be coaxial so that they substantially overlap.

As shown in FIG. 4, the output of the beam splitter (not shown) is incident on target retroreflector 405 at point of incidence 460a. The measurement beam in the input direction 425a passes target retroreflector 405, being once again incident on target retroreflector 405 at point of incidence 460b. The measurement beam in the input direction 425a is then reflected to reference plane retroreflector 410a, being incident thereon also at point 460b. The measurement beam in the input direction 425a passes reference plane retroreflector 410a, being once again incident on reference plane retroreflector 410a at point of incidence 460c. The measurement beam in the input direction 425a is then reflected from reference plane retroreflector 410a back to target retroreflector 405 in order to make a second pass of target retroreflector 405.

Specifically, the measurement beam in the input direction 425a is incident on target retroreflector 405 at point of incident 460c, passes target retroreflector 405, and is again incident on target retroreflector 405 at point of incidence 460d. This pass through target retroreflector 405 represents the second measurement pass of target retroreflector 405.

The measurement beam in the input direction 425a is then reflected from target retroreflector 405 onto reference plane retroreflector 410b, being incident on reference plane retroreflector 410b at point of incidence 460d. The measurement beam in the input direction 425a passes reference frame retroreflector 410b, being once again incident on reference plane retroreflector 410b at point of incidence 460e. From point of incidence 460e, the measurement beam in the input direction 425a is reflected back to target retroreflector 405 to make a third measurement pass of target retroreflector 405.

Specifically, the measurement beam in the input direction 425a is reflected onto target retroreflector 405 at point of incidence 460e. The measurement beam in the input direction 425a passes target retroreflector 405, being once again incident on target retroreflector 405 at point of incidence 460f. This pass represents the third measurement pass of target retroreflector 405.

From point of incidence 460f, the measurement beam in the input direction 425a is reflected from target retroflection 405 onto reference plane retroreflector 410c. As illustrated, there is only a single point of incidence 460f on reference plane retroreflector 410c. This is because reference plane retroreflector 410c serves as a terminal retroreflector, meaning reference plane retroreflector 410c is arranged within interferometer 400 such that it serves as a turnaround point for the measurement beam in the input direction 425a. Accordingly, the measurement beam in the input direction 425a is incident on the vertex of reference plane retroreflector 410c. This vertex incidence causes reference plane retroreflector 410c to reflect the beam back on itself as the measurement beam in the output direction 425b. In other words, the reflected beam from reference plane retroreflector 410c (i.e., the measurement beam in the output direction 425b) is coaxial with the incident beam (i.e., the measurement beam in the input direction 425a).

Once the measurement beam turns around and begins travelling in output direction 425b, the measurement beam will make three more measurement passes of target retroreflector 405. Specifically, the measurement beam in the output direction 425b will make a fourth measurement pass between points of incidence 460f and 460e, a fifth measurement pass between points of incidence 460d and 460c, and a sixth measurement pass between points of incidence 460b and 460a, in that order.

Figure 5:
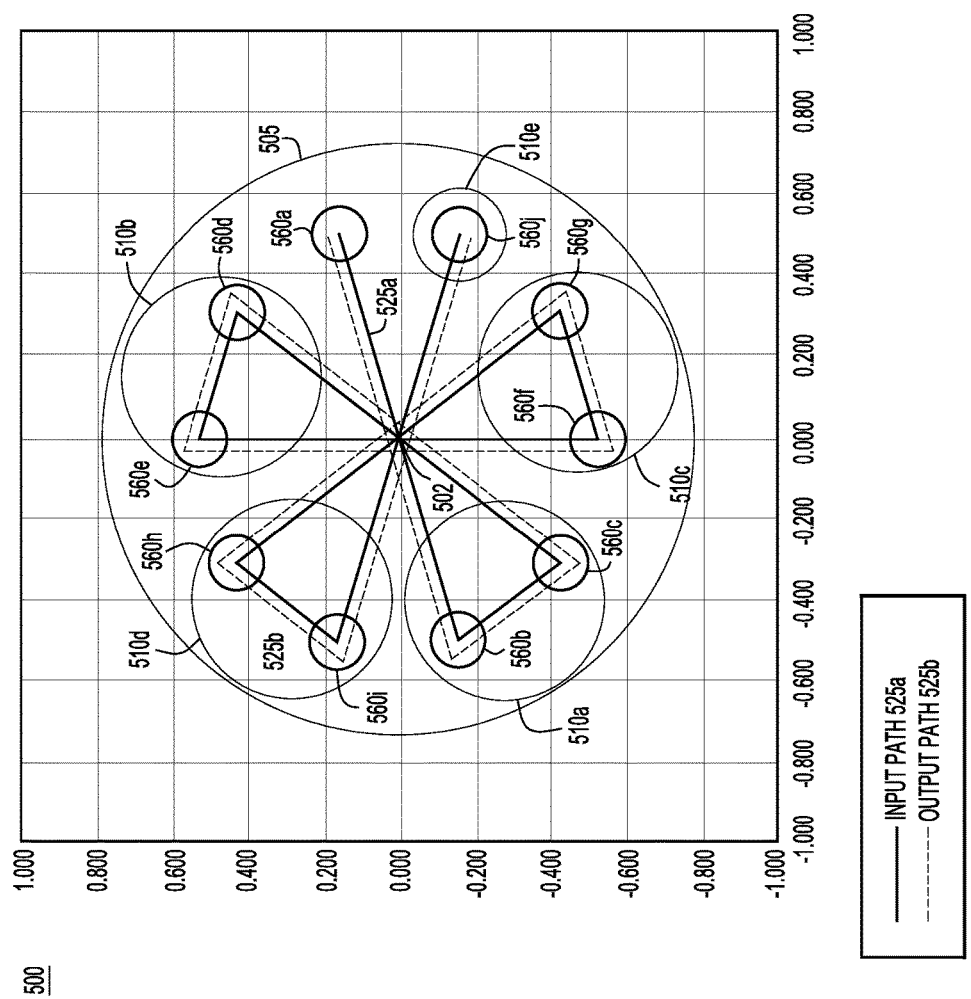
FIG. 5 is a plan view of a fifth interferometer utilizing a multi-pass optical system, according to an example embodiment.

Turning to FIG. 5, depicted therein is a plan view of another example interferometer 500 that is configured to provide ten measurement passes of target retroreflector 505. Like FIG. 4, FIG. 5 is illustrated as a projection of reference plane retroreflectors 510a-e into the plane of the target retroreflector 505. FIG. 5 includes a 0.75R target retro reflector 505, four 0.25R retroreflectors 510a-d, and one 0.125R retroreflector 510e. According to one specific example embodiment, an R value of 1 inch would result in retroreflector 505 having a diameter of 1.5 inches, retroreflectors 510a-d having a diameter of ½ inch, and retroreflector 510e having a diameter of ¼ inch. The relative sizes of retroreflectors 505 and 510a-e, as well as their relative spacings, are selected such that a plurality of measurement passes that step around the central axis 502 of the target retroreflector 505 are made between target retroreflector 505 and reference retroreflectors 510a-e.

Points of incidence 560a-j illustrate where on either target retroreflector 505 or reference plane retroreflectors 510a-e that the measurement beam in the input direction 525a and the measurement beam in the output direction 525b are incident on the retroreflectors. As illustrated, the points of incidence on target retroreflector 505 overlap with the points of incidence on reference plane retroreflectors 510a-e. Furthermore, the points of incidence 560b-j of the measurement beam on the retroreflectors 510a-e are within the perpendicular projection of retroreflector 505 into the reference plane.

Also like in FIG. 4, the measurement beam in the input direction 525a (represented by a solid line) and the measurement beam in the output direction 525b (represented by a dashed line) are illustrated as being slightly offset. In example embodiments, the measurement beam in the input direction 525a and the measurement beam in the output direction 525b may be coaxial so that they substantially overlap.

The measurement beam of FIG. 5 traverses target retroreflector 505 and reference plane retroreflectors 510a-e in a manner similar to that described above with reference to FIG. 4. Specifically, measurement passes of target retroreflector 505 in the input direction 525a and the output direction 525b step around the central axis 502 of the target retroreflector 505. As illustrated, the measurement beam in the input direction 525a travels from point of incident 560a to target retroreflector 505, and then onto reference plane retroreflector 510a. Along this portion of the measurement beam in the input direction 525a, a measurement pass is made when the measurement beam passes target retroreflector 505a between points of incidence 560a and 560b. The measurement beam in the input direction 525a then travels from reference plane retroreflector 510a, to target retroreflector 505, and onto reference plane retroreflector 510b. Along this portion of the measurement beam in the input direction 525a, a second measurement pass of target retroreflector 505 is made between points of incidence 560c and 560d.

Following this same pattern, third, fourth and fifth measurement passes are made by the measurement beam in the input direction 525a between points of incidence 560e and 560f, points of incidence 560g and 560h, and points of incidence 560i and 560j, respectively. When the measurement beam in the input direction 525a is reflected from target retroreflector 505 onto reference plane retroreflector 510e at point of incidence 560j, reference plane retroreflector 510e causes the measurement beam to reflect back upon itself, sending the measurement beam back through interferometer 500 along the output direction 525b.

When traversing interferometer 500 in the output direction 525b, the measurement beam makes an additional five measurement passes of target retroreflector 505. Specifically, measurement passes of target retroreflector 505 are made as the measurement beam in the output direction 525b passes target retroreflector 505 between points of incidence 560j and 560i, points of incidence 560h and 560g, points of incidence 560f and 560e, points of incidence 560d and 560c, and points of incidence 560b and 560a, respectively.

Figure 6:
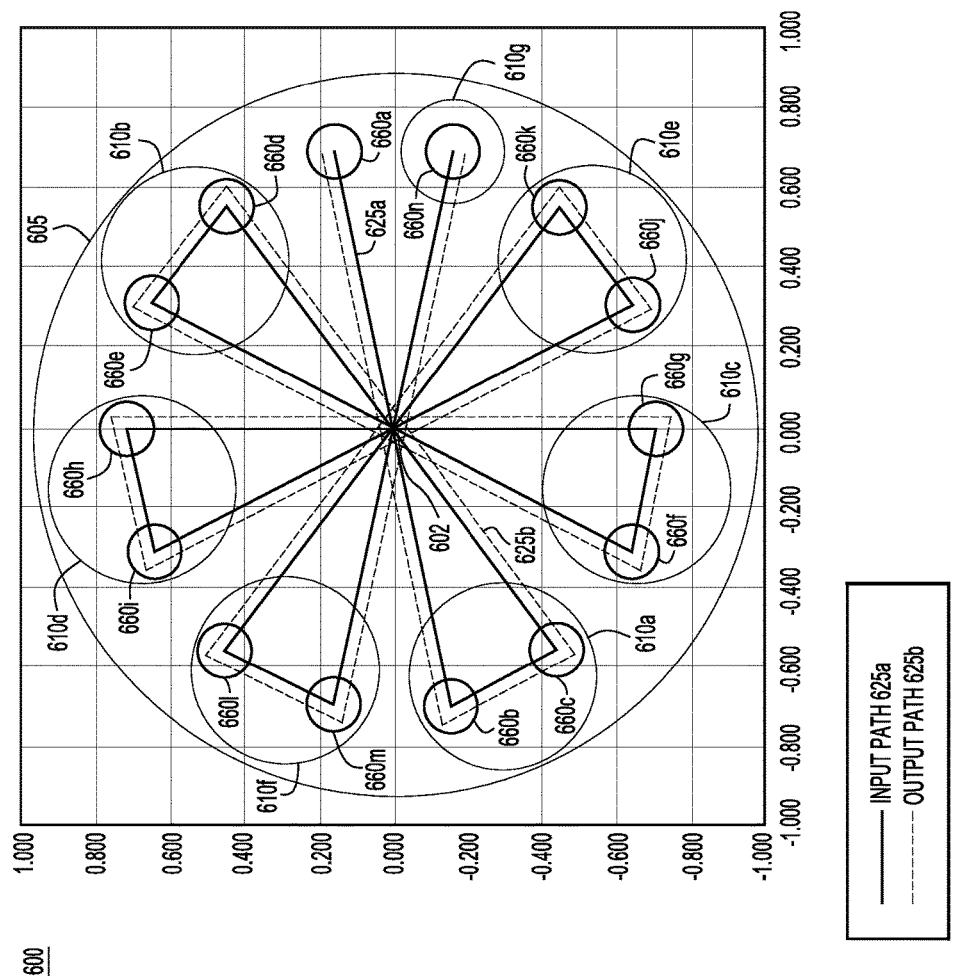
FIG. 6 is a plan view of a sixth interferometer utilizing a multi-pass optical system, according to an example embodiment.
Figure 7:
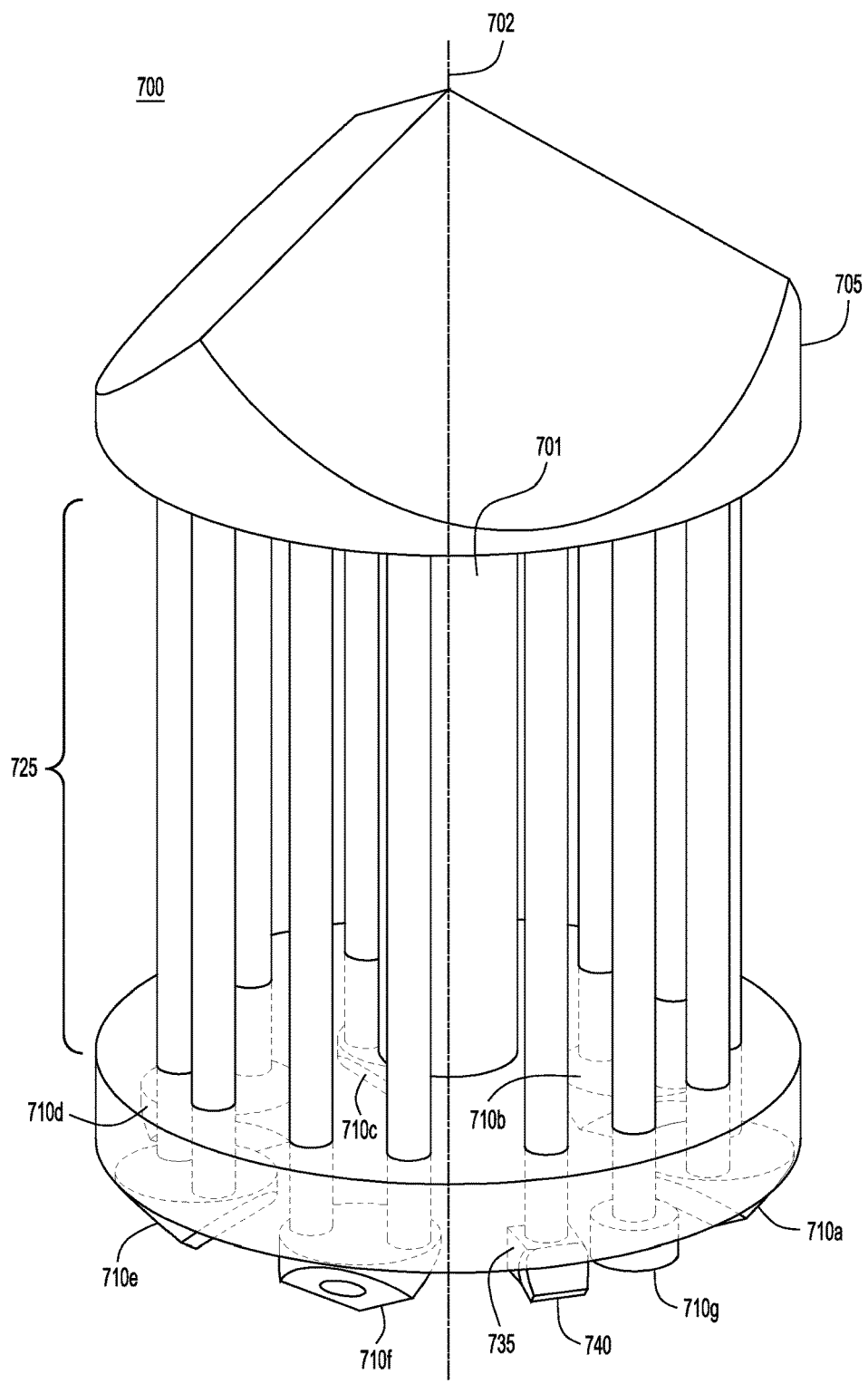
FIG. 7 is a three dimensional perspective view of a seventh interferometer utilizing a multi-pass optical system, according to an example embodiment.

With reference now made to FIG. 6, depicted therein is a plan view of another example interferometer 600 arranged according to the techniques described herein. Like FIGS. 4 and 5, FIG. 6 is illustrated as a projection of reference plane retroreflectors 610a-g into the plane of the target retroreflector 605. Points of incidence 660a-n illustrate where on either target retroreflector 605 or reference plane retroreflectors 610a-g the measurement beam in the input direction 625a and the measurement beam in the output direction 625b are incident on the retroreflectors. Interferometer 600 includes target retroreflector 605 and seven reference plane retroreflectors 610a-g. According to this example, target retroreflector 605 has a radius of R, reference retroreflectors 610a-f have a radius of ¼R, and reference retroreflector 610g has a radius of ⅛R. A representative value for R for such an arrangement would be one inch. The relative sizes of retroreflectors 605 and 610a-g, as well as their relative spacings, are selected such that a plurality of measurement passes that step around the central axis 602 of the target retroreflector 605 are made between target retroreflector 605 and reference retroreflectors 610a-g. Furthermore, the points of incidence 660b-n of the measurement beam on the retroreflectors 610a-g are within the perpendicular projection of retroreflector 605 into the reference plane.

Through this combination of retroreflectors, interferometer 605 is configured to perform fourteen measurement passes of target retroreflector 605. Specifically, measurement passes in the input direction 625a and the output direction 625b step around the central axis 602 of the target retroreflector 605. The first seven measurement passes take place in the input direction 625a as follows:

A first measurement pass, made in the input direction 625a, as the measurement beam passes between points of incidence 660a and 660b as the measurement beam is reflected to reference plane retroreflector 610a from the input of interferometer 600 by target retroreflector 605;

A second measurement pass, made in the input direction 625a, as the measurement beam passes between points of incidence 660c and 660d as the measurement beam passes through target retroreflector 605 between reference plane retroreflectors 610a and 610b;

A third measurement pass, made in the input direction 625a, as the measurement beam passes between points of incidence 660e and 660f as the measurement beam passes through target retroreflector 605 between reference plane retroreflectors 610b and 610c;

A fourth measurement pass, made in the input direction 625a, as the measurement beam passes between points of incidence 660g and 660h as the measurement beam passes through target retroreflector 605 between reference plane retroreflectors 610c and 610d;

A fifth measurement pass, made in the input direction 625a, as the measurement beam passes between points of incidence 660i and 660j as the measurement beam passes through target retroreflector 605 between reference plane retroreflectors 610d and 610e;

A sixth measurement pass, made in the input direction 625a, as the measurement beam passes between points of incidence 660k and 660l as the measurement beam passes through target retroreflector 605 between reference plane retroreflectors 610e and 610f; and A seventh measurement pass, made in the input direction 625a, as the measurement beam passes between points of incidence 660m and 660n as the measurement beam passes through target retroreflector 605 between reference plane retroreflectors 610f and 610g.

Retroreflector 610g serves as a terminal retroreflector, meaning the measurement beam is reflected back onto itself so that it traverses target retroreflector 605 and reference plane retroreflectors 610a-f in the output direction 625b. An additional seven measurement passes of target retroreflector 605 are made in the output direction 625b, as follows:

An eighth measurement pass, made in the output direction 625b, as the measurement beam passes between points of incidence 660n and 660m as the measurement beam passes through target retroreflector 605 between reference plane retroreflectors 610g and 610f;

A ninth measurement pass, made in the output direction 625b, as the measurement beam passes between points of incidence 660l and 660k as the measurement beam passes through target retroreflector 605 between reference plane retroreflectors 610f and 610e;

A tenth measurement pass, made in the output direction 625b, as the measurement beam passes between points of incidence 660j and 660i as the measurement beam passes through target retroreflector 605 between reference plane retroreflectors 610e and 610d;

An eleventh measurement pass, made in the output direction 625b, as the measurement beam passes between points of incidence 660h and 660g as the measurement beam passes through target retroreflector 605 between reference plane retroreflectors 610d and 610c;

An twelfth measurement pass, made in the output direction 625b, as the measurement beam passes between points of incidence 660f and 660e as the measurement beam passes through target retroreflector 605 between reference plane retroreflectors 610c and 610b;

A thirteenth measurement pass, made in the output direction 625b, as the measurement beam passes between points of incidence 660d and 660c as the measurement beam passes through target retroreflector 605 between reference plane retroreflectors 610b and 610a; and A fourteenth measurement pass, made in the output direction 625b, as the measurement beam passes between points of incidence 660b and 660a as the measurement beam passes through target retroreflector 605 between reference plane retroreflector 610a and the output of interferometer 600.

With reference now made to FIG. 7, depicted therein is a three-dimensional perspective view of an interferometer 700 configured to measure medium 701 using multiple passes of target retroreflector 705. Specifically, medium 701 is arranged along the central axis 702 of target retroreflector 705, and an array of retroreflectors 710*a-g* are arranged around central axis 702 in the reference plane, with retroreflector 710*g* serving as a terminal retroreflector. Also illustrated in FIG. 7 is polarizing beam splitter 735 and reference retroreflector 740. As shown through measurement beam path 725, the reference retroreflectors 710*a-g* and polarizing beam splitter 735 are arranged and sized such that the measurement beam path 725 steps around the central axis 702 of the target retroreflector 705. Furthermore, the progression of multiple passes between target retroreflector 705 and the plurality of reference plane retroreflectors 710*a-g* proceeds in a nominally circular pattern around a radius of the target retroreflector such that the central axis 702 of target retroreflector 705 is unobstructed between the target retroreflector 705 and plurality of reference plane retroreflectors 710*a-g*, permitting medium 701 to be arranged along central axis 702. Accordingly, interferometer 700 may be configured to measure the displacement of medium 701 through a compact interferometer that utilizes multiple measurement passes.

Figure 8:
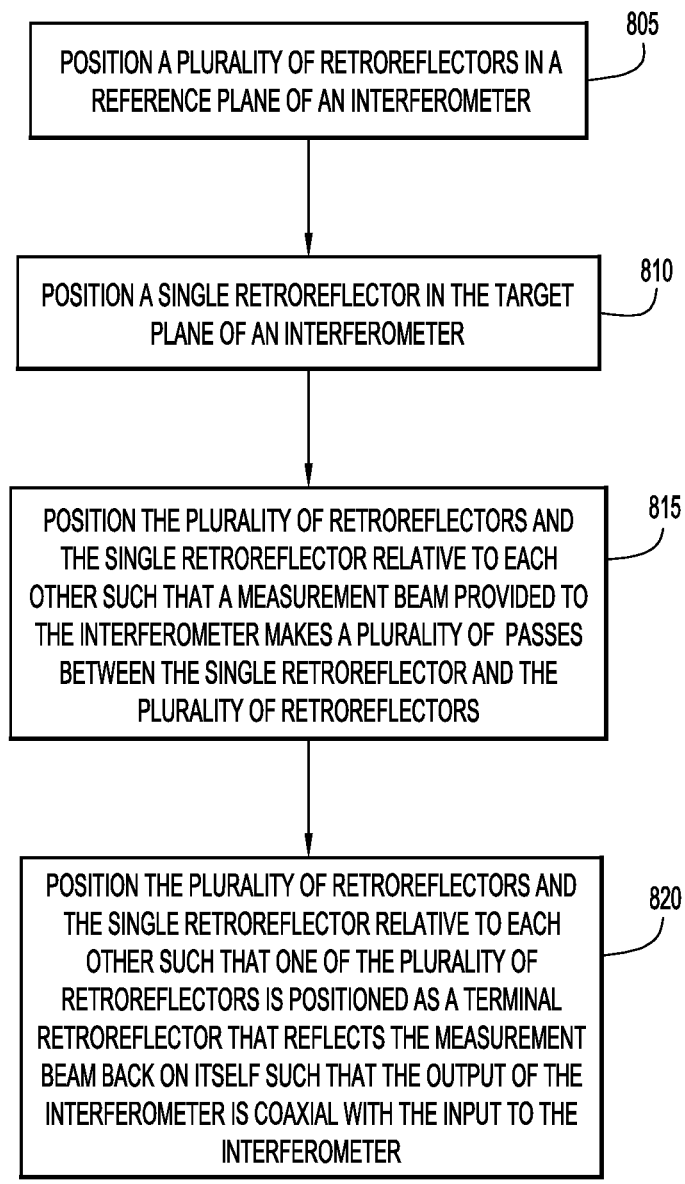
FIG. 8 is a flowchart illustrating a process for constructing an interferometer utilizing a multi-pass optical system, according to an example embodiment.

Turning to FIG. 8, depicted therein is a flowchart 800 illustrating a process for constructing an interferometer according to the techniques described herein. The process begins in operation 805 where a plurality of retroreflectors are positioned in the reference plane of the interferometer. For example, operation 805 may result in retroreflectors being positioned in the reference plane as illustrated in one or more of FIGS. 1-7.

In operation 810 a single retroreflector is positioned in the target plane of the interferometer. For example, operation 810 may result in the positioning of the retroreflector in the target plane as illustrated in one or more of FIGS. 1-7.

In operation 815, the plurality of retroreflectors and the single retroreflector are positioned relative to each other such that a measurement beam provided to the interferometer makes a plurality of passes between the single retroreflector and the plurality of retroreflectors. For example, the single retroreflector and the plurality of retroreflectors are positioned such that the measurement beam takes a path as illustrated in one or more of FIGS. 1-7, including in some example embodiments, paths which steps around a central axis of the single retroreflector.

Finally, in operation 820 the plurality of retroreflectors and the single retroreflector are positioned relative to each other such that one of the plurality of retroreflectors is positioned as a terminal retroreflector that reflects the measurement beam back on itself such that the input to the interferometer is coaxial with an output of the interferometer. In other words, through operations 815 and 820 the interferometer may be constructed such that the measurement beam follows a path like those illustrated in FIGS. 1-7.

In summary, provided for herein are apparatuses comprising interferometers and methods of constructing interferometers. Through the implementation of the techniques described herein, interferometers may be constructed and operated in the picometer stability range through multiple measurement passes of the retroreflector arranged at the target plane. The techniques described herein may be particularly applicable to monolithic and/or homogenous targets. Accordingly, when a single large retroreflector is arranged at the target plane, the multiple passes through different portions of the same retroreflector are all indicative of the target.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus, comprising:
a light source providing a measurement beam; and
an interferometric measuring device, wherein the measuring device comprises:
a target retroreflector arranged at a target plane of the measuring device; and
a plurality of reference plane retroreflectors arranged at a reference plane of the measuring device;
wherein the target retroreflector and the plurality of reference plane retroreflectors are arranged such that:
an optical path of the measurement beam comprises:
an input path projecting the measurement beam into the interferometric measuring device towards the target retroreflector;
the measurement beam being incident on the target retroreflector such that the measurement beam traverses the target retroreflector for a first time;
the measurement beam being incident on the first of the plurality of reference plane retroreflectors and reflecting back to the target retroreflector;
the measurement beam being incident on the target retroreflector such that the measurement beam traverses the target retroreflector for a second time;
the measurement beam being incident on the second of the plurality of reference plane retroreflectors such that the measurement beam reflects back through the target retroreflector and the first of the plurality of reference frame retroreflectors; and
an output path projecting the measurement beam out of the measuring device from the target retroreflector, wherein the output path is coaxial with the input path.

2. The apparatus of claim 1, wherein the path of the measurement beam is incident on the vertex of the second of the plurality of reference plane retroreflectors.

3. The apparatus of claim 1, wherein the path of the measurement beam is incident on the second of the plurality of reference plane retroreflectors such that an incident portion of the measurement beam on the second of the plurality of reference plane retroreflectors is coaxial with a reflected portion of the measurement beam from the second of the plurality of retroreflectors.

4. The apparatus of claim 1, wherein each of the plurality of reference plane retroreflectors reflects the measurement beam onto the target retroreflector.

5. The apparatus of claim 4, wherein the measurement beam is incident on each of the plurality of retroreflectors as a reflected beam from the target retroreflector.

6. The apparatus of claim 1, further comprising a beam splitter, wherein the beam splitter is configured to:
receive an input beam from the light source;
split the input beam into a reference beam and the measurement beam;
project the measurement beam along the input path;
project the reference beam into a reference beam retroreflector;

receive the measurement beam from the output path;
receive a reflected reference beam from the reference beam retroreflector; and
recombine the measurement beam from the output path and the reflected reference beam from the reference beam retroreflector.

7. The apparatus of claim 6, further comprising:
a first quarter wave plate arranged along the input path and the output path; and
a second quarter wave plate arranged between the beam splitter and the reference beam retroreflector.

8. An apparatus comprising:
an interferometer, wherein the interferometer comprises:
a single retroreflector arranged at the target plane of the interferometer; and
a plurality of retroreflectors arranged at the reference plane of the interferometer;
wherein the single retroreflector and the plurality of retroreflectors are positioned such that a measurement beam provided to the interferometer makes a plurality of passes between the single retroreflector and the plurality of retroreflectors such that the measurement beam steps around a central axis of the single retroreflector, and
wherein one of the plurality of retroreflectors is positioned as a terminal retroreflector that reflects the measurement beam back on itself such that an output of the interferometer is coaxial with an input to the interferometer.

9. The apparatus of claim 8, wherein a medium to be measured is arranged at the central axis of the single retroreflector.

10. The apparatus of claim 8, wherein the terminal retroreflector is positioned such that the measurement beam is incident on a vertex of the terminal retroreflector.

11. The apparatus of claim 8, wherein the single retroreflector is larger than each of the plurality of retroreflectors.

12. The apparatus of claim 8, further comprising:
a light source providing an input beam;
a beam splitter; and
a reference beam retroreflector,
wherein the light source provides an input beam to the beam splitter,
wherein the beam splitter splits the input beam into the measurement beam and a reference beam,
wherein the beam splitter directs the measurement beam towards the single retroreflector, and
wherein the beam splitter directs the reference beam towards the reference beam retroreflector.

13. The apparatus of claim 8, wherein the measurement beam makes the plurality of passes between the single retroreflector and the plurality of retroreflectors based on a size differential between the single retroreflector and each of the individual retroreflectors within the plurality of retroreflectors and the spacing of the individual retroreflectors within the plurality of retroreflectors.

14. The apparatus of claim 8, wherein a progression of multiple passes between the target retroreflector and plurality of reference plane retroreflectors proceeds in a nominally circular pattern around a radius of the target retroreflector such that the central axis of the apparatus is unobstructed between the target retroreflector and plurality of reference plane retroreflectors.

15. A method comprising:
positioning a single retroreflector in a target plane of an interferometer;
positioning a plurality of retroreflectors in a reference plane of an interferometer;
positioning the plurality of retroreflectors and the single retroreflector relative to each other such that a measurement beam provided to the interferometer makes a plurality of passes between the single retroreflector and the plurality of retroreflectors;
positioning the plurality of retroreflectors and the single retroreflector relative to each other such that one of the plurality of retroreflectors is positioned as a terminal retroreflector that reflects the measurement beam back on itself such that an output beam of the interferometer is coaxial with an input beam of the interferometer.

16. The method of claim 15, wherein positioning the plurality of retroreflectors and the single retroreflector relative to each other comprises positioning the plurality of retroreflectors and the single retroreflector relative to each other such that the measurement beam steps around a central axis of the single retroreflector as it makes the plurality of passes.

17. The method of claim 15, further comprising:
positioning a beam splitter in the reference plane,
positioning a reference retroreflector in the reference plane, and
providing an input beam to the beam splitter,
wherein positioning the beam splitter and the reference retroreflector comprises positioning the beam splitter and reference retroreflector such that the input beam is split by the beam splitter to provide a reference beam and the measurement beam; the beam splitter directs the reference beam towards the reference retroreflector, and directs the measurement beam toward the single retroreflector.

18. The method of claim 17, wherein positioning the beam splitter in the reference plane comprises positioning the beam splitter in the reference plane such that the measurement beam in an input direction is coaxial with the measurement beam in an output direction at the beam splitter.

19. The method of claim 15, wherein positioning the plurality of retroreflectors and the single retroreflector relative to each other comprises positioning the plurality of retroreflectors in the reference plane such that points of incidence of the measurement beam on the plurality of retroreflectors are within a projection of the single retroreflector into the reference plane.

20. The method of claim 15, wherein positioning the plurality of retroreflectors and the single retroreflector relative to each other comprises positioning one of the plurality of retroreflectors such that the measurement beam is incident on the vertex of the one of the plurality of retroreflectors.

* * * * *